Patented Mar. 2, 1948

2,436,885

UNITED STATES PATENT OFFICE 2,436,885

DIELECTRIC COMPOSITION COMPRISING POLYCHLOROPRENE, WAX, AGE RESISTOR, AND ANTIOXIDANT

Louis P. Gould and John W. Whiteside, Dayton, Ohio, assignors to General Motors Corporation, Detroit, Mich., a corporation of Delaware No Drawing. Application January 29, 1944, Serial No. 520,318

4 Claims. (Cl. 260—28)

This invention relates to dielectric compounds and is particularly concerned with dielectric compounds used for insulation on high tension wires and the like.

In recent years, due to the rapid improvements in internal combustion engines increasing demands have been placed on dielectric material used in connection with ignition systems thereof, this is particularly emphasized in aeronautical applications. High altitude operation of airplanes makes it necessary for dielectric material used therein to function properly at extremely low temperatures and pressures and to maintain satisfactory dielectric properties under the most exacting conditions.

It has been determined by aeronautical authorities that a good dielectric for use in aeronautical work must have properties which are not found grouped in the conventional type of dielectric material. These are:

(1) The material must have high dielectric strength under any and all conditions of temperature;

(2) The material must be of high corona resistance under any and all conditions and particularly at low barometric pressures wherein it has been found that the corona effect around high tension cables liberates ozone which readily oxidizes rubber and rubber compounds normally used for insulation.

(3) The material must be resistant to change under a wide range of temperature conditions so that the strength of the insulation remains substantially constant and the insulation remains in place even when the engine is operating at high temperatures.

(4) The material must have a low compression set so that a seal may be obtained without use of excessive pressure since many cables used in aeronautical applications are sealed by the dielectric from the atmosphere wherein the dielectric also seals the cylinder compression.

The foregoing requirements make it necessary to obtain a dielectric material having equally as high insulating properties as are found in conventional dielectric materials, and including the added properties so important under the conditions of operation heretofore set forth.

It is, therefore, an object of this invention to provide a dielectric material that has a high corona resistance together with good dielectric strength low compression set and high heat resistance.

In carrying out the above object it is a further object to provide a dielectric material having as a base one of the polymerized chloroprenes, which material is compounded with various ingredients to provide the required properties.

Another object of the invention is to form a compound having as a base one of the polymerized chloroprenes which includes an oxidation resistant material, wax and age resister therein that will bloom during use of the compound and thereby regenerate the surface to protect the same against hardening or cracking as occasioned by oxidation.

In carrying out this object it is a further object to compound the polymerized chloroprene with sufficient age resister, anti-oxidant and wax to create a blooming material which even though the surface is rubbed clean in use will regenerate a protective layer thereover due to the blooming effect of the protective agents added to the base.

Further objects and advantages of the present invention will be apparent from the following description.

In making up a compound to suit all of the requirements heretofore set forth, we use a rubber-like material preferably selected from the synthetic rubbers, such as one of the polymerized chloroprenes known to the trade as "neoprene."

In preparation of the compound the synthetic rubber is mixed with suitable curing agents such as zinc oxide, magnesium oxide and a coloring agent, such as carbon black and/or iron oxide but such coloring agent should be in small quantities, as any large quantities thereof may reduce the dielectric properties of the compound. To this is added an anti-oxidant which is polymerized trimethyl dihydro-quinoline. In combination with the anti-oxidant, a suitable age resister should also be added which has the dual function of acting as an age resister and an anti-oxidant. This age resister is a compound of the diaryl ethylene diamine series, such as diphenyl ethylene diamine. The age resister has blooming qualities which are aided by the addition of a second material which will bloom namely, a high molecular weight hydrocarbon wax of the methane or paraffin series. This wax preferably contains at least 24 carbon atoms per molecule, one suitable wax being known as Syncera wax. The wax and the age resister upon blooming tend to carry the anti-oxidant to the surface of the compound for protecting the surface against oxidation. The entire compound is reinforced with a suitable filler, for example, clay, diatomaceous earth, etc., together with a plasticizing agent taken from the fatty acids for example, stearic acid.

In the compounding of this material we prefer to take the neoprene and mix it in a Banbury mixer or on a rubber mill with the curing agent, wax, anti-oxidant and age resister. The reenforcing filler is added and finally the remainder of the ingredients are gradually added whereupon the material is milled until a complete mixture is obtained. The mixture is then allowed to age for from 24 to 48 hours. This step is not absolutely necessary but it has been found to improve the final material. After aging the mixture is warmed and then calendered into thin sheets or extruded in any other form desired whereupon it is finally cured.

The final curing is accomplished under heat and pressure preferably at 60 pounds sq. in. steam pressure at about 307° F. or the equivalent. It has been found that during this curing period the tensile strength increases until a substantially maximum value is obtained after ten minutes cure and from this point on the tensile strength remains substantially constant. The elongation also remains substantially constant after reaching a maximum value. These factors are important since it has been found that the physical properties of the compound improve rapidly and reach a maximum upon curing and then remain constant over a long period of time in differentiation to normal insulating compounds wherein the physical properties gradually increase over long periods of time whereby an insulation which is soft and ductile when applied to a wire gradually hardens and becomes brittle. Thus, it is apparent that the constancy of the physical characteristics of this compound is necessary and desirable.

During the curing, the combined anti-oxidant, age resister and wax tends to bloom or exude from the material and form a waxy surface thereover which prevents oxidation of the surface of the insulating material. This is an important factor in the success of this invention. Upon inspection of the material it has been noted that when this wax film has been removed due to wiping of the wire or excessive bending to cause a crack in the wax covering surface that a regeneration of the surface is accomplished by subsequent blooming which heals the crack by replenishing the wax surface so that ozone generated by the corona effect does not deleteriously affect the insulation per se.

It is a known fact that rubber or rubber compounds upon long positioning in a strained condition will develop surface cracks which, if exposed to the action of a strong oxidizing agent, such as ozone, will be aggravated and will continue to grow until such cracks completely nullify the dielectric effect of the coating. In the present invention it has been found that if a crack of this nature does occur that the exudation of the waxy materials in the compound regenerates the surface and thereby always provides a protective coating and prevents any appreciable oxidation of the surface or growth in surface cracks which may occur. This is one of the most important advantages of this invention and is probably the reason for the tremendous commercial success of the invention as used in aeronautical applications.

For illustrative purposes a preferred formula and a formula with a range of ingredients is given hereinafter.

| Name | Preferred formula, parts | Formula Range, parts |
|---|---|---|
| Neoprene GR-M | 100.0 | 100 |
| Zinc Oxide | 5.0 | 2-10 |
| Extra Light MgO | 4.0 | 2-10 |
| Age Resister | 2.5 | 1-5 |
| Stearic Acid | 1.0 | .5-2 |
| Anti-Oxidant | 2.5 | 1-5 |
| Clay | 100.0 | 0-150 |
| Carbon Black | 0.5 | 0-1.0 |
| Syncera Wax | 10.0 | 1-20 |
| Iron Oxide | 1.0 | 0-1.5 |
|  | 226.5 |  |

It is to be understood that in these formulas the zinc oxide and magnesium oxide may vary considerably even from the ranges noted. Such variation however is will known in the art and, therefore, further elaboration is believed unnecessary. The variation in the filler from the preferred quantity, may be utilized to harden or soften the compound. The amount of age resister and anti-oxidant in compounds should vary inversely as the quantity of wax noted to yield a satisfactory bloom. That is to say, since the age resister per se is a blooming agent, that when a high quantity is used less wax may be used and vice versa. It is also manifest that the dielectric will be quite successful in many other uses wherein less critical properties are required and in these instances, variations from the formulas may be effected in accordance with the experience of one skilled in the art. In all instances of variations, the compound should be made up and tested for its specific use in order to determine its ability to withstand operating conditions.

The blooming quality of the insulation material is an important factor and prevents deterioration of the insulation and forms a protective coating which will regenerate under all conditions of use and thereby prolong the life of the insulation while maintaining its efficiency.

Actual tests on a dielectric of the preferred formula above noted show that the specific combination of wax, anti-oxidant and age resister is necessary to provide the desired results. These tests are as follows:

The compounds tested were:

A. Standard compound with wax, age resister and anti-oxidant.
B. Compound without wax and anti-oxidant.
C. Compound without wax and age resister.
D. Compound without wax.
E. Compound without age resister and anti-oxidant.

Results of tests

| Compound | Hardness Shore Type "A" Durometer | Tensile, #/sq. in. | Elongation, Per Cent | Compression set-ASTM-method B 22 hrs. at 158° F. |
|---|---|---|---|---|
| | | | | Per cent |
| A | 65 | 2,230 | 805 | 40.60 |
| B | 75 | 1,880 | 680 | 34.20 |
| C | 78 | 1,865 | 665 | 34.25 |
| D | 75 | 2,205 | 750 | 36.70 |
| E | 71 | 1,660 | 700 | 40.10 |

| Compound | Heat Resistance (Bending test) Hours at 350° F. | | Corona Resistance 2 hr. in 0.04% ozone and 30% stretch |
|---|---|---|---|
| | 4 hrs. | 70 hrs. | |
| | | | (Break) |
| A | OK | Superficial Cracks | None, surface unaffected. |
| B | OK | Breaks in two | 63 minutes. |
| C | OK | do | 54 minutes. |
| D | OK | do | Slight Crack. |
| E | Surface Cracks | Very brittle, breaks in two, entire surface blistered or wavy. | Surface Cracks. |

From these tests it is conclusively shown that compound A, the standard mix containing the wax, age resister and anti-oxidant is the only compound to yield consistently satisfactory results. It is further shown that the removal of any one or more of the three important ingredients causes the compound to be unsatisfactory in one or more of the required tests.

While the embodiments of the present invention as herein disclosed, constitute preferred forms, it is to be understood that other forms might be adopted, all coming within the scope of the claims which follow.

What is claimed is as follows:

1. A dielectric compound for use under a wide range or temperature and pressure conditions comprising a base of polymerized chloroprene which has from 1 to 20% by weight of a hydrocarbon wax incorporated therein, and also including from 1 to 5% of an age resister consisting of diphenyl ethylene diamide and from 1 to 5% of an anti-oxidant consisting of polymerized trimethyl dihydroquinoline, the wax and the age resister having blooming qualities whereby the anti-oxidant is conveyed to the surface of the compound for resisting oxidation at the surface of the compound the quantity of combined age resister and anti-oxidant varying inversely to the quantity of wax used.

2. A dielectric compound for use under a wide range of temperature and pressure conditions comprising a base of 100 parts of polymerized chloroprene which has from 1 to 20 parts by weight of a hydrocarbon wax incorporated therein, which has at least 24 carbon atoms per molecule therein, and including from one to five parts of polymerized trimethyldihydroquinoline as an anti-oxidant and from one to five parts diphenyl ethylene diamine as an age resister, said age resister in combination with the wax having blooming qualities for carrying the anti-oxidant to the surface of the material for forming an oxidation resistant surface which may be regenerated as required due to the blooming qualities of the wax and age resister the quantity of combined age resister and anti-oxidant varying inversely to the quantity of wax used.

3. A dielectric compound comprising in combination polymerized chloroprene as a base, compounded with a hydrocarbon wax of the methane series in quantities of from 1% to 20% of the chloroprene, and also including from 1 to 5% polymerized trimethyl dihydroquinoline together with from 1 to 5% diphenyl ethylene diamine, said compound being highly resilient and having substantially constant physical characteristics over a wide range of temperatures and also including an oxidation resistant film over the surface thereof supplied by the blooming of said wax and diphenyl ethylene diamide which carries the polymerized trimethyldihydroquinoline to the surface of the compound the combined quantity of diphenyl ethylene diamine and polymerized trimethyl dihydroquinoline varying inversely to the quantity of wax used.

4. A resilient corona resistant dielectric compound for use in connection with high tension cables, comprising in combination, polymerized chloroprene 100 parts, polymerized trimethyl dihydroquinoline 2½ parts, diphenyl ethylene diamine 2½ parts, and a wax selected from the methane series and having at least 24 carbon atoms per molecule 10 parts.

LOUIS P. GOULD.
JOHN W. WHITESIDE.

REFERENCES CITED

The following references are of record in the file of this patent:

UNITED STATES PATENTS

| Number | Name | Date |
|---|---|---|
| 1,950,436 | Williams | Mar. 13, 1934 |
| 2,313,945 | Kellog et al. | Mar. 16, 1943 |

OTHER REFERENCES

Vanderbilt, 1942. Rubber Handbook, published, 1942, by R. T. Vanderbilt Co., New York, N. Y., page 233.

India Rubber World, article by Norris, pages 55–56; March 1, 1930, vol. 81, No. 6.

Ind. and Eng. Chemistry, article by Yerzley, pages 330–335; March, 1943, vol. 35, No. 3.